United States Patent [19]

Gibbs

[11] 4,307,924
[45] Dec. 29, 1981

[54] ELECTRICAL PLUG HAVING INTEGRAL FINGER PULL AND CORD GRIP

[75] Inventor: Ronald D. Gibbs, Naperville, Ill.

[73] Assignee: Belden Corporation, Geneva, Ill.

[21] Appl. No.: 98,653

[22] Filed: Nov. 29, 1979

[51] Int. Cl.³ ............................................. H01R 13/58
[52] U.S. Cl. .............................. 339/110 P; 339/119 C; 339/147 C
[58] Field of Search ........................ 339/110 P, 62, 105, 339/119 C, 195 R, 195 A, 196 R, 196 A, 147 C

[56] References Cited

U.S. PATENT DOCUMENTS 2,182,446 12/1939 Nelson ............................ 339/119 C
3,275,969 9/1966 Sheeran .......................... 339/119 C

FOREIGN PATENT DOCUMENTS 1293275 4/1969 Fed. Rep. of Germany ... 339/119 C
471817 1/1929 German Democratic Rep. ............................. 339/195 A Primary Examiner—John McQuade
Attorney, Agent, or Firm—Fitch, Even, Tabin, Flannery & Welsh

[57] ABSTRACT

An electrical plug for use with a flat type insulated conductor cord, the plug including an integral plug body having a generally rectangular finger pull flange formed integral therewith at a position enabling easy and safe finger grasping of the plug independent of the orientation of the plug. The finger pull flange has a cord receiving and gripping recess formed therein which facilitates entry and releasable gripping of the flat conductor when moved in a direction generally transverse to its longitudinal axis.

6 Claims, 6 Drawing Figures

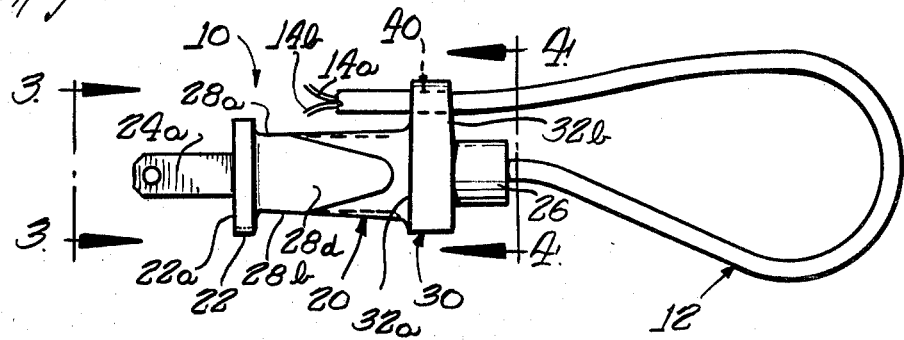

ELECTRICAL PLUG HAVING INTEGRAL FINGER PULL AND CORD GRIP

The present invention relates generally to electrical attachment plugs employed with electrical conductors to facilitate connection to electrical outlets and the like, and more particularly to a novel electrical attachment plug for use with flat generally parallel cordage type insulated conductors, the plug including an integral body having a novel finger pull provided thereon to enable safe finger grasping of the plug independent of its orientation, and wherein the finger pull has a cord receiving and gripping recess therein enabling insertion and releasable gripping of the electrical cord.

It is a conventional practice in connection with electrical appliances and the like to provide a terminal attachment plug on a flexible conductor cord for connecting the appliance to a suitable electrical outlet. Such electrical plugs are made of insulating material, frequently a molded plastic or rubber material, which, except for the exposed contact prongs protruding from one end of the plug, enable finger manipulation of the plug as during insertion of the contact prongs into and withdrawal from a wall socket or other electrical connector.

Recent requirements for improved safety features on electrical plugs, as promulgated by product certification companies, call for the bodies of electrical plugs of the 2-wire parallel blade type as being shaped so that the plug is not likely to be grased at the periphery of the face from which the contact blades extend, but rather invite grasping at a section formed for such purpose, such as a depressed finger gripping region formed between two higher sections. It is readily apparent that this requirement improves safety in a two-fold manner. It substantially prevents accidental finger contact with the contact blades or prongs of the plug while still partially inserted in an electrical outlet, and it decreases the likelihood of inadvertent or accidental pulling or tugging on the associated electrical cord.

Another desirable feature of any such electrical plug, and particularly those employed with household appliances, is the ability of the plug to be releasably attached to its associated conductor cord after wrapping the conductor around the appliance so as to prevent the plug from being subjected to impact forces which might bend the contact prongs or otherwise damage the plug.

A necessary feature of any electrical plug of the aforedescribed type is that it be relatively economical to manufacture so that it is competitive in the marketplace.

One of the primary objects of the present invention is to provide a novel electrical plug for use with a conductor cord and which combines the features of an integral finger pull and cord grip to facilitate safe finger grasping of the plug independent of its outlet connection orientation, and which enables the plug to be readily attached to its associated cord during nonuse such as after winding the cord around an associated appliance or other device.

A more particular object of the present invention is to provide an electrical plug for use with a flat type parallel cordage conductor cord wherein the plug has a relatively slim profile so as to minimize material requirements in forming a molded plug body, and wherein the plug body has a flange finger pull formed integral therewith and extending radially from the plug body about the full circumference thereof, the finger pull flange being spaced rearwardly from the contact prong end of the plug and having a cord receiving and gripping recess formed thereon to facilitate releasable connection of the plug to its associated conductor cord.

A feature of the electrical plug in accordance with the present invention lies in providing the cord receiving and gripping recess in the finger pull flange with camming surfaces cooperative with the flat electrical cord in a manner facilitating full insertion of the flat cord into the recess when the cord is moved in a direction transverse to its longitudinal axis.

Further objects and advantages of the present invention, together with the organization and manner of operation thereof, will become apparent from the following detailed description of the invention when taken in conjunction with the accompanying drawing wherein like reference numerals designate like elements throughout the several views, and wherein:

FIG. 1 is a side elevational view of an electrical plug constructed in accordance with the present invention connected in gripping relation with an associated electrical cord of the flat parallel cordage type;

FIG. 2 is a top plan view of the electrical plug of FIG. 1 but with the associated electrical cord being removed from the cord gripping recess;

FIG. 3 is an end view, on an enlarged scale, taken substantially along line 3—3 of FIG. 1 looking in the direction of the arrows;

FIG. 4 is a fragmentary sectional view, on an enlarged scale, taken substantially along line 4—4 of FIG. 1 but with the conductor cord removed from the cord gripping recess;

FIG. 5 is a view similar to FIG. 4 but illustrating partial insertion of the flat conductor cord into the cord gripping recess in the finger pull flange of the plug; and FIG. 6 is a view similar to FIG. 5 but showing the conductor cord fully inserted within the gripping recess of the finger pull.

Referring now to the drawing, and in particular to FIG. 1, an electrical plug constructed in accordance with the present invention is indicated generally at 10. The electrical plug 10, which may alternatively be termed a terminal plug or attachment plug, is of the type adapted for use with an insulated electrical conductor cord which, in the illustrated embodiment, comprises a generally flat parallel cordage type cord 12. The flat conductor cord 12 includes a pair of parallel electrical conductor elements 14a and 14b which are encased in a molded insulating casing or sheath 16 conventionally made of a suitable flexible material such as rubber or a suitable plastic so that the major transverse axis of the cord is of substantially greater dimension than the minor transverse axis. Such cordage is frequently employed with electrical appliances.

The plug 10 includes an integral molded plug body 20 having a generally planar first or forward end surface 22a formed on a forward rectangular flange 22 transverse to the longitudinal axis of the plug body and from which a pair of laterally spaced parallel electrical contact prongs or blades 24a and 24b extend. The contact blades 24a,b are generally centered on the end surface 22a and have electrical connection to the respective conductor elements 14a and 14b internally of the plug body, as is known. The contacts 24a,b may be of substantially identical size or may have different transverse widths so as to constitute polarized contact blades requiring a particular orientation of the plug 10 when connected to a polarized type electrical outlet such as a wall mounted receptacle or the connector end of an extension cord or the like. The conductor cord 12 extends longitudinally from a second or opposite end of the plug body 20 defined by a generally cylindrical boss 26 integral with the molded plug body.

The plug body 20 is generally rectangular in transverse cross section along its length and is defined along the major portion of its length by a pair of opposite generally parallel planar surfaces 28a and 28b, which may be termed the upper and lower surfaces of the plug body shown in FIG. 1, and opposite lateral side surfaces 28c and 28d which form longitudinal corner edges with the upper and lower surfaces 28a,b. The surfaces 28a–d extend rearwardly from the forward flange 22, with the lateral surfaces 28c and 28d curving inwardly toward the longitudinal axis of the plug body as they approach the second or rearward end 26, as illustrated in FIG. 2. The forward flange 22 is formed to extend outwardly beyond the respective surfaces 28a–d about the full periphery of the plug body. The relatively slim profile of the plug body 20 thus formed requires considerably less material in forming the plug body, as by a conventional molding process, thereby resulting in less bulk and greater cost savings than has heretofore been achieved.

In accordance with one important feature of the present invention, the plug body 20 has a finger pull, indicated generally at 30, formed integral therewith adjacent the second or rearward end 26 of the connector body and at which the longitudinal surfaces 28a–d terminate. The finger pull 30 is defined by a generally rectangular flange having parallel planar forward and rearward surfaces 32a and 32b, respectively, disposed transverse to the longitudinal axis of the plug body. As illustrated in FIGS. 1 and 2, the finger pull flange 30 is generally parallel to the forward flange 22 and extends radially from the longitudinal axis of the plug body a distance greater than the contiguous longitudinal surfaces 28a–d and the cylindrical boss 26, with the outer periphery of the finger pull flange being defined by generally rectangular edge surfaces 34a,b,c and d. The lateral edge surfaces 34b and 34d may be nonplanar as illustrated in FIG. 4 for manufacturing purposes, as is known.

By positioning the finger pull flange 30 longitudinally rearwardly from the forward flange 22, a finger gripping area is defined between the flanges 22 and 30 which invites gripping of the plug body 20 forwardly of the finger pull flange 30 when inserting the contact blades of the plug into or withdrawing them from an associated electrical outlet receptacle. In this manner, it is highly unlikely that one would grasp the plug 10 at the periphery of the forward surface 22a during handling. In withdrawing the plug from an electrical outlet, the operator's fingers would also engage the finger pull flange 30 so as to substantially prevent grasping and pulling of the associated conductor 12 adjacent its connection to the plug body. Such safe gripping of the receptacle would be effected irrespective of whether one were to grip the opposite longitudinal surfaces 28a,b or the lateral surfaces 28c,d due to the finger pull flange 30 extending radially outwardly from the plug body about the full periphery thereof.

An additional feature of the invention lies in the provision of a cord receiving and gripping recess, indicated generally at 40, formed in the finger pull 30 to enable releasable connection of the plug 10 to a length of the flat conductor cord 12 such as after winding the cord around an associated appliance or other device to prevent the plug from acidentally being stepped on or subjected to an impact force that might damage the plug contact blades 24a,b or the internal electrical connections between the conductor elements 14a,b and the contact blade. The cord receiving and gripping recess 40 is formed in a portion of the finger pull flange 30 which extends radially from the longitudinal axis of the plug body a distance greater than the remaining sides of the rectangular finger pull. In the illustrated embodiment, the cord receiving and gripping recess 40 is formed in the peripheral surface 34a of the finger pull flange and is defined by an elongated recess having a configuration, when considered in a plane transverse to the longitudinal axis of the plug body as in FIG. 4, similar in configuration and dimensional size to the transverse cross section area of the electrical cord 12. As thus defined, the recess 40 has generally semi-cylindrical opposite end surfaces 40a and 40b which terminate at their upper edges in an access opening defined between uniform radius camming surfaces 40c and 40d which blend with the outer edge surface 34a of the finger pull flange 30. The cam surfaces 40c,d are spaced apart a distance greater than the minor transverse dimension of the cord 12 to enable edgewise insertion of the flat cord 12 into the recess 40 by relative movement between the cord and plug body 20 in a direction transverse to the longitudinal axis of the cord.

FIGS. 5 and 6 illustrate the manner in which the plug 10 may be releasably attached to the conductor 12. As shown in FIG. 5, the portion of the cord 12 to be received within the gripping recess 40 is oriented so as to introduce one of the parallel insulated conductors of the cord edgewise into the access opening to the gripping recess 40. At this point, the remaining insulated conductor of the cord is cammed against the adjacent camming surface, such as 40d, so that continued transverse force application on the cord urges the inserted insulated conductor against the end surface 40a of the recess, followed by a downward camming movement of the last-to-enter conductor on the cam surface 40d until it enters the recess and engages the opposite end surface 40b of the gripping recess. The cam surfaces 40c and 40d are formed on opposed flexible lips of the finger pull flange defining the access opening to recess 40 and intersect the respective end surfaces 40a,b at relatively sharp corners 40e and 40f which with the flexible lips serve to retain the cord within the gripping recess 40.

By placing the finger pull flange 30 and associated cord gripping recess 40 at a location spaced longitudinally rearwardly from the forward end flange 22 of the plug body, the associated cord 12 may be inserted into the gripping recess and retained therein while the plug body is connected to a wall outlet or similar receptacle. This feature is particularly desireable to enable the length of the cord between the plug and an associated appliance or the like in a relatively taut condition by accumulating any excess cord length at the location of the plug.

The plug body 20 is preferably made of a material having sufficient flexibility to enable relatively easy insertion of the associated cord 12 into the gripping recess 40 yet having sufficient rigidity to hold the cord within the gripping recess. A polyvinylchloride or other suitable flexible polymeric material, such as one having a Shore A hardness of approximately 83 may, for example, be employed as the material from which the plug body is formed. It will be appreciated that the dimensional size of the plug 10 may be varied for use with various AWG cords or for SPT cords, the gripping recess 40 being modified accordingly to receive and efficiently grip the particular cord with which the plug 10 is employed.

It will thus be understood that in accordance with the present invention a safety plug is provided having an integral finger pull and combined cord grip which define with a forward integral flange a finger gripping area located between the two higher flanges so that safe and efficient manipulation of the electrical plug is facilitated independently of the plugs particular orientation relative to an electrical outlet to which the plug may be connected. Additionally, the cord receiving and gripping recess 40 and its location within the radially extending finger pull flange 30 enables releasable connection of the plug body to a length of the associated cord while maintaining a firm grip on the finger gripping area of the plug body. Still further, insertion of a length of the cord into the gripping recess while the plug body is connected to an electrical outlet, such as a wall outlet, may be readily accomplished.

While a preferred embodiment of the present invention has been illustrated and described, it will be understood that changes and modifications may be made therein without departing from the invention in its broader aspects. Various features of the invention are defined in the following claims.

What is claimed is:

1. An electrical plug for use with an insulated conductor cord of the generally flat parallel conductor element type having a greater major transverse dimension than its minor transverse dimension, said plug comprising a plug body having contact prongs extending from a first end and having a length of said conductor cord extending generally longitudinally from an opposite second end, said body having a first generally rectangular flange thereon disposed substantially transverse to the longitudinal axis of said body and defining said first end, said body having a second generally rectangular flange formed integral thereon adjacent said second end, said body having external surfaces extending longitudinally between said first and second flanges and defining a finger gripping surface area between said flanges, said first and second flanges each extending radially from the longitudinal axis of said body about the full periphery of said body a distance greater than the adjacent external surfaces defining said finger gripping area, said second flange defining a finger pull having a cord gripping recess in its peripheral edge surface having a configuration substantially similar to the transverse cross section of said conductor cord and orientated so that a plane containing the axes of the conductor elements when inserted within said recess is substantially normal to a plane containing the minor axis of the cord and the longitudinal axis of said plug body, said gripping recess having an access opening defined by laterally opposed camming surfaces spaced apart a distance greater than the minor transverse dimension of the cord but less than the major transverse dimension of the cord so as to require edgewise insertion of the cord into said recess, said camming surfaces being cooperative with said cord so that said cord is cammed against one of said camming surfaces and urged into said recess during edgewise movement of said cord in a direction substantially transverse to its longitudinal axis such that said cord is fully received in and releasably retained within said recess.

2. An electrical plug as defined in claim 1 wherein longitudinal external surfaces defining said finger gripping surface area comprise pairs of opposite generally parallel surfaces.

3. An electrical plug as defined in claim 1 wherein said camming surfaces are defined on retaining lips formed on said second flange and configured to overlie said cord when fully inserted within said recess with the longitudinal axis of the cord disposed parallel to the longitudinal axis of said plug body.

4. An electrical plug as defined in claim 1 wherein said finger pull flange having said cord gripping recess formed therein is spaced longitudinally from said first flange a distance sufficient to enable insertion of said cord within said recess with said contact prongs inserted into an electrical wall mounted receptacle.

5. An electrical plug as defined in claim 1 wherein the portion of said second flange having said cord gripping recess therein extends radially from the longitudinal axis of said plug body a distance greater than the remaining portion of said second flange.

6. An electrical plug as defined in claim 1 wherein said plug body is made of a vinyl material having a Shore A hardness of approximately 83.

* * * * *